United States Patent [19]

Skeie

[11] Patent Number: 4,625,207

[45] Date of Patent: Nov. 25, 1986

[54] SURFACE ACOUSTIC WAVE PASSIVE TRANSPONDER HAVING AMPLITUDE AND PHASE-MODIFYING SURFACE PADS

[75] Inventor: Halvor Skeie, San Jose, Calif.

[73] Assignee: X-Cyte Inc., Mountain View, Calif.

[21] Appl. No.: 509,526

[22] Filed: Jun. 30, 1983

[51] Int. Cl.⁴ .......................... G01S 13/80; H03H 9/68; H03H 9/145

[52] U.S. Cl. .................... 342/51; 310/313 B; 333/152; 333/196

[58] Field of Search ......... 343/6.5 SS, 6.8 R, 6.8 LC; 310/313 R, 313 B, 313 D; 333/150, 151, 152, 153, 154, 155, 193, 194, 195, 196

[56] References Cited

U.S. PATENT DOCUMENTS

| | | | |
|---|---|---|---|
| 3,273,146 | 9/1966 | Hurowitz, Jr. | 343/6.8 R |
| 3,706,094 | 12/1972 | Cole et al. | 343/6.8 R X |
| 3,755,803 | 8/1973 | Cole et al. | 343/6.8 R X |
| 4,058,217 | 11/1977 | Vaughan et al. | 209/559 |
| 4,059,831 | 11/1977 | Epstein | 343/6.8 R |
| 4,143,340 | 3/1979 | Hunsinger | 333/194 X |
| 4,217,564 | 8/1980 | Avtran | 333/152 |
| 4,263,595 | 4/1981 | Vogel | 343/6.5 SS |

Primary Examiner—T. H. Tubbesing
Assistant Examiner—Gilberto Barrón, Jr.
Attorney, Agent, or Firm—Karl F. Milde, Jr.

[57] ABSTRACT

A passive transponder for use in an interrogation/transponder system comprises a substrate having a substrate surface defining a path of travel for surface acoustic waves; a launch transducer element arranged on the surface for converting interrogating signals into surface acoustic waves which propagate along the path of travel; a plurality of tap transducer elements arranged on the surface at spaced intervals along the path of travel for converting surface acoustic waves into respective output signals; and a circuit, connected to the tap transducer elements, for combining the output signals of these transducer elements to form reply signals. In order to control the delay time from transducer element to transducer element, one or more "delay pads" are provided on the substrate surface between these transducer elements.

10 Claims, 8 Drawing Figures

SURFACE ACOUSTIC WAVE PASSIVE TRANSPONDER HAVING AMPLITUDE AND PHASE-MODIFYING SURFACE PADS

CROSS REFERENCE TO RELATED APPLICATIONS

The present application is related in subject matter to the following commonly owned applications for patent:

Application Ser. No. 509,523, filed June 30, 1983, for "System for Interrogating A Passive Transponder Carrying Amplitude and/or Phase Encoded Information" of P. Nysen, H. Skeie and D. Armstrong;

Application Ser. No. 509,522, filed June 30, 1983, for "Apparatus For Compensating Non-Linearities In A Frequency-Modulated Signal" of P. Nysen;

Application Ser. No. 509,521, filed June 30, 1983, for "Surface Acoustic Wave Passive Transponder Having Optimally-Sized Transducers" of H. Skeie;

Application Ser. No. 509,525, filed June 30, 1983, for "Surface Acoustic Wave Transponder Having Parallel Acoustic Wave Paths" of H. Skeie;

Application Ser. No. 509,524, filed June 30, 1983, for "Surface Acoustic Wave Passive Transponder Having Non-Reflective Transducers and Pads" of H. Skeie;

Application Ser. No. 509,527, filed June 30, 1983, for "Surface Acoustic Wave Passive Transponder Having Acoustic Reflectors" of H. Skeie and P. Nysen.

BACKGROUND OF THE INVENTION

The present invention relates to a "passive interrogator label system" (PILS); that is a system comprising an interrogator for transmitting an interrogation signal, one or more "labels" or passive transponders which produce a reply signal containing coded information in response to the interrogation signal, and a receiver and decoding system for receiving the reply signal and decoding the information contained therein.

A passive interrogator label system of the type to which the present invention relates is disclosed in the U.S. Pat. No. 3,273,146 to Horwitz, Jr.; U.S. Pat. No. 3,706,094 to Cole and Vaughan; U.S. Pat. No. 3,755,803 to Cole and Vaughan; and U.S. Pat. No. 4,058,217 to Vaughan and Cole. In its simplest form, the systems disclosed in these patents include a radio frequency transmitter capable of transmitting RF pulses of electromagnetic energy. These pulses are received at the antenna of a passive transponder and applied to a piezoelectric "launch" transducer adapted to convert the electrical energy received from the antenna into acoustic wave energy in the piezoelectric material. Upon receipt of a pulse, an acoustic wave is generated within the piezoelectric material and transmitted along a defined acoustic path. Further "tap" transducers arranged at prescribed, space intervals along this path convert the acoustic wave back into electric energy for reconversion into electrical energy by the launch transducer. The presence or absence of tap transducers at the prescribed locations along the acoustic wave path determines whether a reply pulse will be transmitted with a particular time delay, in response to an interrogation pulse. This determines the informational code contained in the transponder reply.

When an acoustic wave pulse is reconverted into an electrical signal it is supplied to an antenna on the transponder and transmitted as RF electromagnetic energy. This energy is received at a receiver and decoder, preferably at the same location as the interrogating transmitter, and the information contained in this response to an interrogation is decoded.

In systems of this general type, the informatin code associated with and which identifies the passive transponder is built into the transponder at the time that the tap transducers are deposited onto the substrate of piezoelectric material. As mentioned above, the presence or absence of tap transducers at prescribed locations along the acoustic wave paths determines whether a reply pulse will be transmitted with a particular time delay in response to an interrogation pulse. With this type of encoding, the number of possible codes is $2^N$ where N is the number of tap transducers. For a large number of codes, it is necessary to provide a large number of tap transducers; however, increasing the number of tap transducers reduces the efficiency of energy conversion and introduces spurious signals into the reply signal.

SUMMARY OF THE INVENTION

It is an object of the present invention to provide a passive transponder adapted for use in an interrogation system for transmitting a reply signal containing encoded information in response to the receipt of an interrogating signal.

It is another object of the present invention to provide a passive transponder of the above-noted type which comprises a substrate having a substrate surface defining a path of travel for acoustic waves; a launch transducer element arranged on the surface for converting the interrogating signal into an acoustic wave which propogates along the path of travel; a plurality of tap transducer elements arranged on the surface at spaced intervals along the path of travel for converting an acoustic wave into respective output signals; and a circuit, connected to the tap transducer elements, for combining the output signals of these transducer elements to form a reply signal.

It is a further object of the present invention to provide a passive transponder of the above-noted type which permits a large number of codes to be generated with a minimum number of tap transducers.

These objects, as well as further objects which will become apparent from the discussion that follows, are achieved, according to the present invention, by arranging acoustic wave delay pads on the surface of the substrate along the path of travel of the acoustic wave to control the acoustic wave propogation time from transducer to transducer.

Advantageously, some delay pads are constructed in such a way as to also control the attenuation of the acoustic waves that pass beneath them. To effect this attenuation, at least one edge of such pads is serrated on a side thereof perpendicular to the path of travel of the acoustic wave. The width of the serration in the direction of the path of travel is substantially equal to $n\lambda/2$ where n is an odd integer and $\lambda$ is the center wavelength of the acoustic waves. Such a serration thus causes portions of the wave which pass beneath the serrated edge to be 180° out of phase with respect to each other.

In a preferred embodiment, the delay pads according to the present invention are utilized in a particular passive interrogator label system disclosed in the commonly owned patent application Ser. No. 509,523, filed June 30, 1983, for "System for Interrogating a Passive Transponder Carrying Amplitude and/or "Phase-Encoded Information" of P. Nysen, H. Skeie, and D.

Armstrong. In this system, the interrogator transmits a first, interrogation signal having a first frequency which successively assumes a plurality of frequency values within a prescribed frequency range. This first frequency may, for example, be in the range of 905–925 MHz, a frequency band which is freely available in many parts of the world for short-range transmission.

The remote, passive transponder associated with this interrogator receives the first signal as an input and produces a second, reply signal as an output. Signal transforming means within the transponder convert the first signal in such a way as to impart a known informational code in the second signal which is associated with and identifies the particular passive transponder.

Associated with the interrogator of the system is a receiver for receiving the second signal from the passive transponder and a mixer, arranged to receive both the first signal and the second signal, or signals derived therefrom, for mixing together these two signals thereby to produce a further signal. This further signal may, for example, contain the sum and the difference frequencies of the first and the second signals, respectively.

Finally, the system includes a signal processor responsive to the signal produced by the mixer for detecting the frequencies contained in this signal thereby to determine the informational code associated with the passive transponder.

For a full understanding of the present invention, reference should now be made to the following detailed description of the preferred embodiments of the invention and to the accompanying drawings.

DESCRIPTION OF THE PREFERRED EMBODIMENTS

Figure 1:
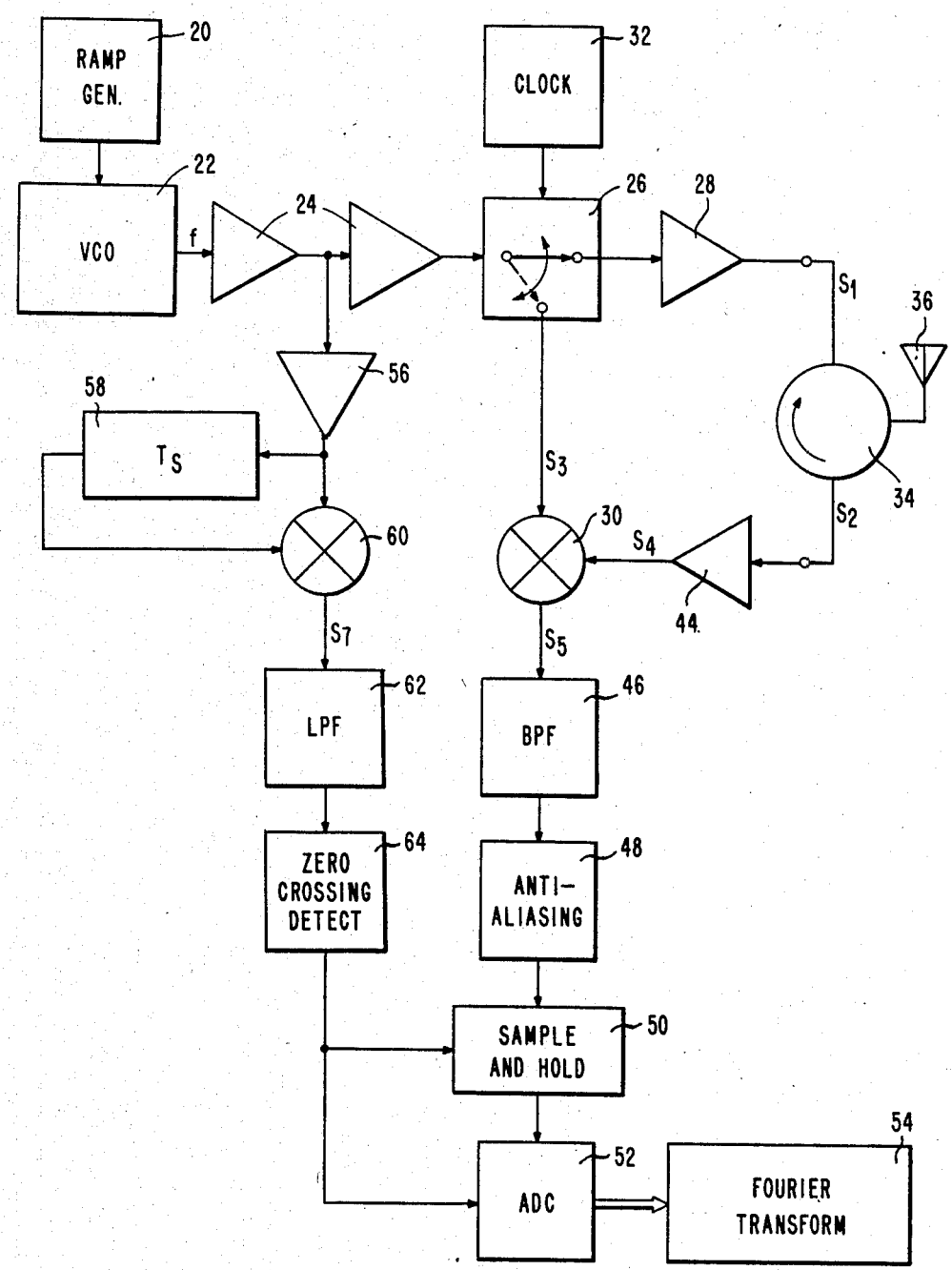
FIG. 1 is a block diagram of a system for transmitting an interrogation signal, receiving a reply signal and decoding information encoded in the reply signal.

The present invention will now be described with reference to FIGS. 1–8 of the drawings. Identical elements in the various figures are designated by the same reference numerals.

FIGS. 1–7 illustrate an interrogator-transponder system employing a surface acoustic wave transponder which may form the environment of the present invention. A system of this general type is disclosed in the U.S. Pat. No. 3,706,094 to Cole and Vaughn. This particular system is described in detail in the commonly-owned patent application Ser. No. 509,523, filed June 30, 1983, for "System for Interrogating a Passive Transponder Carrying Amplitude and/or Phase-Encoded Information" of P. Nysen, H. Skeie and D. Armstrong.

The transmitter/receiver and decoder system shown in FIG. 1 comprises a ramp generator 20 which supplies a sawtooth waveform to a voltage controlled oscillater (VCO) 22. The VCO produces an output signal of frequency f which repeatedly ramps linearly upward from a frequency of 905 MHz to a frequency of 925 MHz. This signal is amplified by the RF amplifiers 24 and supplied to a transmit/receive switch 26. The switch 26 directs the signal either to a transmitter power amplifier 28 or to a decoding mixer 30. The switch 26 is controlled by an 100 KHz square wave signal produced by a clock 32. The output signal $S_1$ from the amplifier 28 is supplied to an external circulator or transmit/receive (TR) switch 34 and is transmitted as electromagnetic radiation by an antenna 36.

Figure 2:
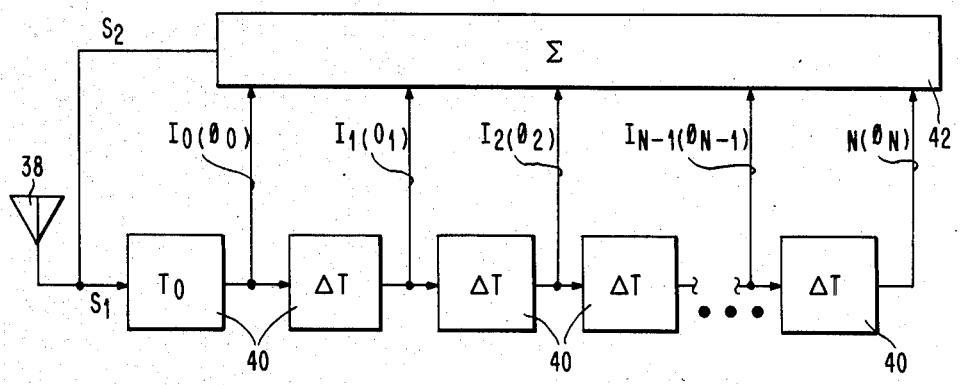
FIG. 2 is a block diagram of a passive transponder adapted for use with the system of FIG. 1.

A block diagram of the transponder associated with the system of FIG. 1 is shown in FIG. 2. The transponder receives the signal $S_1$ at an antenna 38 and passes it to a series of delay elements 40 having the indicated delay periods $T_0$ and $\Delta T$. After passing each successive delay, a portion of the signal $I_0, I_1, I_2 \ldots I_N$ is tapped off and supplied to a summing element 111. The resulting signal $S_2$, which is the sum of the intermediate signals $I_0 \ldots I_N$, is fed back to the antenna 38 for transmission to the antenna 36 in the system of FIG. 1.

The transponder reply signal $S_2$ is received by the antenna 36 and passed through the circulator or TR switch 34 to a receiver amplifier 44. The output $S_4$ of this amplifier 44 is heterodyned in the mixer with the signal $S_3$ intermittently presented by the switch 26.

The output $S_5$ of the mixer 30 contains the sum and the difference frequencies of the signals $S_3$ and $S_4$. This output is supplied to a band pass filter 46 with a pass band between 1 and 3 KHz. The output of this filter is passed through an anti-aliasing filter 48 to a sample-and-hold circuit 50.

The sample-and-hold device supplies each sample to an analog-to-digital converter 54. The A/D converter, in turn, presents the digital value of this sample to a processor 54 that analyzes the frequencies contained in the signal by means of a Fourier transform. The sample-and-hold device 50 and the A/D converter 52 are strobed by a sampling signal which serves to compensate for the non-linearity, with respect to time, in the monotonically increasing frequency f of the VCO output signal.

To effect compensation the signal of frequency f produced by the VCO 22 is passed via an isolating amplifier 56 to a delay element 58 with a constant signal delay $T_S$. Both the delayed and the undelayed signals are supplied to a mixer 60 which produces a signal $S_7$ containing both sum and difference frequencies. The signal $S_7$ is supplied to a low-pass filter 62 which passes only the portion of this signal containing the difference frequencies. The output of the low-pass filter is supplied to a zero-crossing detector 64 which produces a pulse at each positive (or negative) going zero crossing. These pulses are used to strobe the sample-and-hold device 50 and the A/D converter 52.

Figure 3:
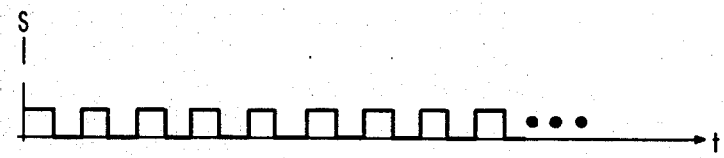
FIG. 3 is a timing diagram indicating the clock output in the system of FIG. 1.
Figure 4:
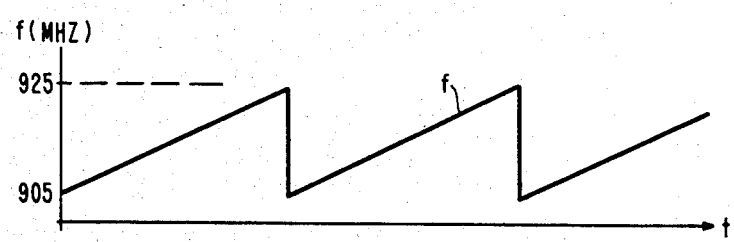
FIG. 4 is a frequency vs. time diagram illustrating the transmitted signal in the system of FIG. 1.
Figure 5:
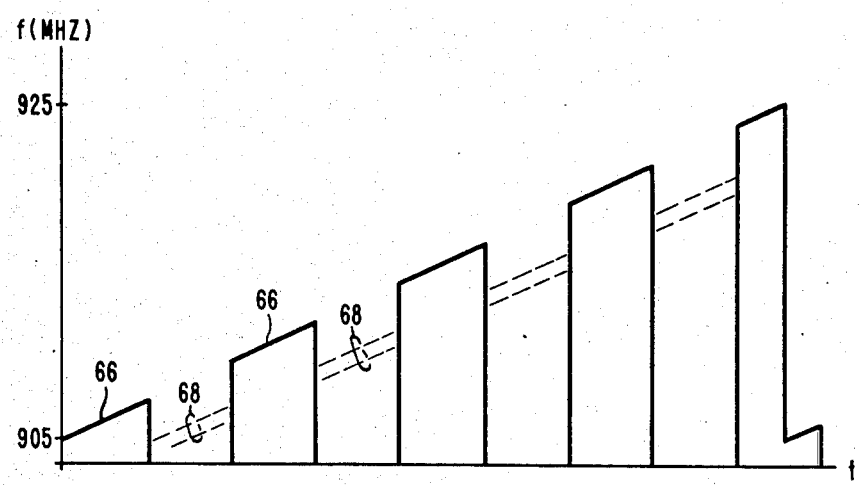
FIG. 5 is a frequency vs. time diagram illustrating both the transmitted and the received signal in the system of FIG. 1.

FIGS. 3–5 illustrate the operation of the circuit of FIG. 1. FIG. 3 shows the 100 KHz output of the clock 32; FIG. 4 shows the frequency sweep of the signal produced by the VCO 22. FIG. 5 shows, in solid lines 66, the frequency of the transmitted signal $S_1$ and, in dashed lines 68, the frequency of the signal $S_2$ is received from the transponder. As may be seen, the signal 68 is received during the interval between transmissions of the signal 66. These intervals are chosen to equal, approximately, the round trip delay time between the transmission of a signal to the transponder and the receipt of the transponder reply. As indicated by the multiple dashed lines, the transponder reply will contain a number of frequencies at any given instant of time as a result of the combined (i.e., summed) intermediate signals having different delay times ($T_0$, $T_0+\Delta T$, $T_0+2\Delta T$, ... $T_0+N\Delta T$).

Figure 6:
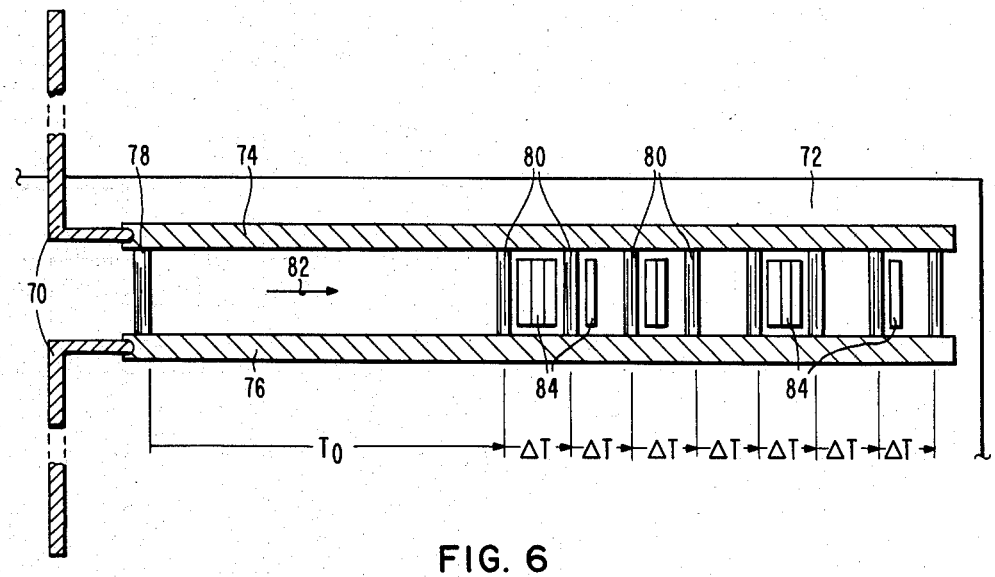
FIG. 6 is a plan view, in enlarged scale, of a particular implementation of the transponder of FIG. 2.
Figure 7:
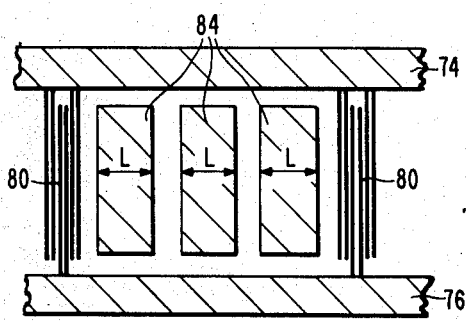
FIG. 7 is a plan view, in greatly enlarged scale, of a portion of the implementation shown in FIG. 6.

FIGS. 6 and 7 illustrate an embodiment of a passive transponder which implements the block diagram of FIG. 2. This transponder operates to convert the received signal $S_1$ an acoustic wave and then to reconvert the acoustic energy back into an electrical signal $S_2$ for transmission via a dipole antenna 70. More particularly, the signal transforming element of the transponder includes a substrate 72 of piezoelectric material such as a lithium niobate ($LiNbO_3$) crystal. One the surface of this substrate is deposited a layer of metal, such as aluminum, forming a pattern such as that shown in detail in FIG. 7. For example, this pattern may consist of two bus bars 74 and 76 connected to the dipole antenna 70, a "launch" transducer 78 and a plurality of "tap" transducers 80. The bars 74 and 76 thus define a path of travel 82 for an acoustic wave which is generated by the launch transducer and propogates substantially linearly, reaching the tap transducers each in turn. The tap transducers convert the acoustic wave back into electrical energy which is collected and therefore summed by the bus bars 74 and 76. This electrical energy then activates the dipole antenna 70 and is converted into electromagnetic radiation for transmission as the signal $S_2$.

The tap transducers 80 are provided at equally spaced intervals along the acoustic wave path 82, as shown in FIG. 6, and an informational code associated with the transponder is imparted by providing a selected number of "delays pads" 84 between the tap transducers. These delay pads, which are shown in detail in FIG. 7, are preferably made of the same material as, and deposited with, the bus bars 74, 76 and the transducers 78, 80. Each delay pad has a width sufficient to delay the propagation of the acoustic wave from one tap transducer 80 to the next by one quarter cycle or 90° with respect to an undelayed wave at the frequency of operation (circa 915 MHz). By providing locations for three delay pads between successive tap transducers, the phase $\phi$ of the acoustic wave received by a tap transducer may be controlled to provide four phase possibilities:

1. No pad between successive tap transducers = $-90°$;
2. One pad between successive tap transducers = $0°$;
3. Two pads between successive tap transducers = $+90°$
4. Three pads between successive tap transducers = $+180°$.

Referring to FIG. 2 the phase information $\phi_0$ (the phase of the signal picked up by the first tap transducer in line), and $\phi_1, \phi_2 \ldots \phi_N$ (the phases of the signals picked up by the successive tap transducers) is supplied to the combiner (summer) which in the embodiment of FIG. 6 comprises the bus bars 74 and 76. This phase information, which is transmitted as the signal $S_2$ by the antenna 70, contains the informational code of the transponder.

As shown in FIG. 7, the three delay pads 84 between two tap transducers 80 are each of such a width (L) as to provide a phase delay of 90° in the propogation of an acoustic wave from one tap transducer to the next as compared to the phase in the absence of such a delay pad. This width (L) is dependent upon the material of both the substrate and the delay pad itself as well as upon the thickness of the delay pad and the wavelength of the surface acoustic wave. As noted above, the substrate material is preferably lithium niobate ($LiNbO_3$) and, the delay pad material is preferably aluminum.

In the equations below, $V_o$ equals the propogation velocity of an acoustic wave on a "free surface" without a delay pad ($V_o$=3488 meters/second for a lithium niobate substrate); $V_s$=the propogation velocity of an acoustic wave on a surface which is shorted with an infinitely thin delay pad; $\phi$=the nominal phase delay in the transmission of an acoustic wave from one tap transducer to the following tap transducer when there is no delay pad; and $\Delta\phi$=the additional phase delay imparted by one delay pad. Let us now define:

$$[(V_0-V_s)/V_0] = \tfrac{1}{2}K^2,$$

where K is a "coupling constant" for a metalized (aluminum) piezoelectric (lithium niobate) surface.

Since, $$\frac{\Delta\phi}{\phi} = \frac{V_o - V_s}{V_o} + \frac{kt}{\lambda}, \text{ and}$$

$$\phi = \frac{2\pi L}{\lambda},$$

where
  $kt/\lambda$ is an approximation term due to mass loading by the pad;
  k is a proportionality constant dependent on the substrate and pad materials; and
  t is the thickness of the pad,
therefore we have, $$\frac{\Delta\phi\lambda}{2\pi L} = \tfrac{1}{2}K^2 + \frac{kt}{\lambda},$$

and $$L = \frac{\Delta\phi\lambda}{2\pi\left[\tfrac{1}{2}K^2 + \frac{kt}{\lambda}\right]}.$$

The preferred thickness of the delay pad film is approximately 0.1 micrometers. The manufacture of the transponder is facilitated if three delay pads are initially deposited between all the tap transducers and, thereafter, delay pads are selectively removed to impart the code to the transponder.

With pads providing a 90° delay, there are four code possibilities for each set of three delay pads. Consequently, for the transponder illustrated in FIG. 6 having seven sets of delay pads, $4^7$ code possibilities are provided.

Figure 8:
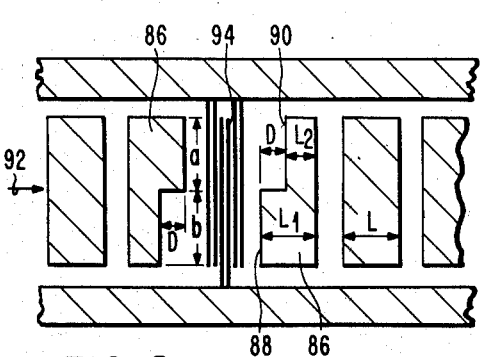
FIG. 8 is a plan view, in greatly enlarged scale, of acoustic wave delay pads having serrated edges for controlling the acoustic wave attenuation.

FIG. 8 illustrates delay pads 86 which make it possible to control the amplitude as well as the phase of the acoustic wave. Such amplitude modification may be detected by the receiver and decoder system so that additional codes may be imparted in the transponder without requiring additional tap transducers and delay pads.

In this case, the amplitude modification of the surface acoustic wave takes the form of a prescribed attenuation. This attenuation is effected by wave cancellation at the edge of the delay pad.

As is shown in FIG. 8, the serrated edge of the delay pads 86 have a first edge portion 88 and a second edge portion 90 which are perpendicular to the path of travel 92 of the surface acoustic wave but are displaced with respect to each other in the direction of the path of travel by a distance D. The first edge portion 88 has a total length a whereas the second edge portion has a total length b. It will be understood that, whereas the serrated edge is shown to have only two segments in FIG. 8, the edge may be divided into several segments for each edge portion. It is necessary only that the segments of the first edge portion all have a delay pad width $L_1$, whereas the segments of the second edge portion have a delay pad width $L_2$.

Thus, the distance a is the sum of all the first edge portion segments, whereas the distance b is the sum of all the second edge portion segments.

The maximum wave cancellation at the serrated edge is provided when the distance D is selected such that the difference in delay provided by the pad at the first and the second edge portion, respectively, is n 180°, where n is an odd integer. More specifically, D is preferably selected such that $\phi_1 - \phi_2 = n\pi$ radians, where $\phi_1$, is the additional delay provided by the delay pad over the distance $L_1$, and $\phi_2$ is the additional delay provided by the delay pad over the distance $L_2$.

From the formula derived above for the width L of a delay pad, we have:

$$L_1 = \frac{\Delta\phi_1 \lambda}{2\pi X}$$

where, $$X = \tfrac{1}{2}K_s^2 + \frac{kt}{\lambda}$$

$$L_2 = \frac{\Delta\phi_2 \lambda}{2\pi X}$$

$$D = L_1 - L_2 = (\Delta\phi_1 - \Delta\phi_2)\left[\frac{\lambda}{2\pi X}\right]$$

$$D = n\pi\left[\frac{\lambda}{2\pi X}\right]$$

$$D = \frac{n\lambda}{K_s^2 + 2kt/\lambda}$$

The amount of attenuation provided by the serrated edge may be controlled either by varying the distance D to provide more or less than the optimum delay as defined by the formula above, or by varying the relative total lengths a and b of the first and second edge portions. If we let W be the attenuation weighting factor, then $$W = (a-b)/(a+b),$$

under optimum delay conditions.

As may be seen from this formula, the maximum attenuation occurs when a equals b (W=0). The minimum attenuation occurs when either a or b equals zero (W=1).

It is recommended that the amplitude modifying delay pads 88 be formed in mirror image before and after a tap transducer 94 as illustrated in FIG. 8. This arrangement compensates for irregularities in the acoustic wave front caused by these delay pads.

There has thus been shown and described a novel surface acoustic wave passive transponder, having amplitude and phase-modifying delay pads, which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a passive transponder adapted for use in an interrogation system for transmitting a reply signal containing coded information in response to the receipt of an interrogating signal, said transponder comprising:

(a) a substrate having a substrate surface defining a plurality of paths of travel for surface acoustic waves, each path of travel having a different length from its beginning to its end; and (b) electric circuit means, disposed on said substrate, for propagating surface acoustic waves along said paths of travel, from said beginning of each path to said end thereof;

the improvement comprising a plurality of selectively removable surface acoustic wave delay pads of prescribed width disposed on the surface of said substrate at prescribed locations along a plurality of said paths of travel to increase the surface acoustic wave propagation time by prescribed increments from said beginning of each of said plurality of paths to said end thereof, the number of said pads in each travel path determining said increase in acoustic wave propagation time along that path, whereby the number of said pads in each travel path may be selected to impart said coded information to said reply signal.

2. The improvement defined in claim 1, wherein from zero to three pads are provided along said at least one travel path to provide one of four possible codes for that travel path.

3. The improvement defined in claim 1, wherein said pads are identical in size.

4. The improvement defined in claim 2, wherein each pad is dimensioned to provide a propagation time phase delay of 90° in the surface acoustic wave during propagation of such wave from said beginning of its respective travel path to said end thereof.

5. The improvement defined in claim 1, wherein said pad is formed of a metal layer on said surface of said substrate.

6. The improvement defined in claim 5, wherein said metal is aluminum.

7. The improvement defined in claim 1, wherein the width (L) of said pad in the direction of travel of said acoustic wave and the thickness (t) of said pad are selected in accordance with the following formula:

$$L = \frac{\Delta\phi\lambda}{2\pi\left[\frac{1}{4}K_s^2 + \frac{kt}{\lambda}\right]}$$

wherein $\alpha\phi$ is the phase delay provided by the pad, $\lambda$ is the center wave length of the acoustic wave, and $K_s$ and $k$ are constants.

8. The improvement defined in claim 7, wherein the phase delay $\Delta\phi$ is 90°.

9. The improvement defined in claim 1, wherein at least one edge of said pad is serrated on a side thereof perpendicular to said path of travel, thereby to control attenuation of said acoustic wave.

10. The improvement defined in claim 9, wherein said serrated edge forms first and second edge portions which are perpendicular to said path of travel but displaced with respect to each other in the direction of said path of travel by a distance D such that the difference in delay provided by said pad at said first and second edge portions, respectively, is n·180°, where n is an odd integer.

* * * * *